May 18, 1954  R. E. PROCTOR, JR  2,678,621
INDICATING INSTRUMENT

Filed March 8, 1948  2 Sheets-Sheet 1

INVENTOR.
ROBERT E. PROCTOR JR
BY
ATTORNEY

May 18, 1954  R. E. PROCTOR, JR  2,678,621
INDICATING INSTRUMENT
Filed March 8, 1948  2 Sheets-Sheet 2
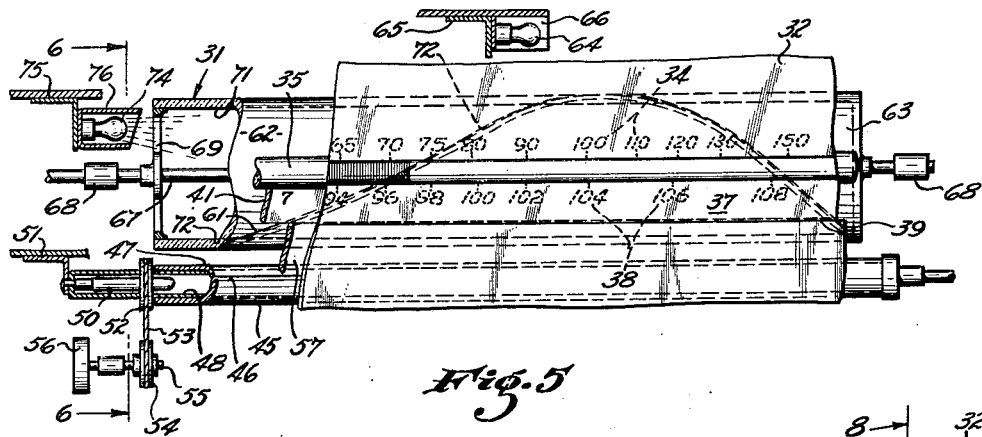
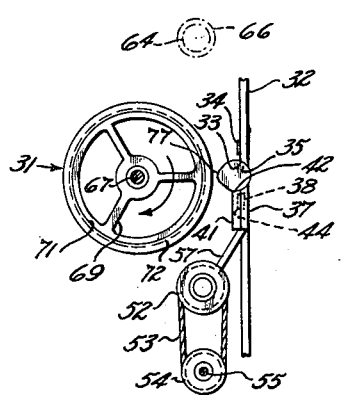
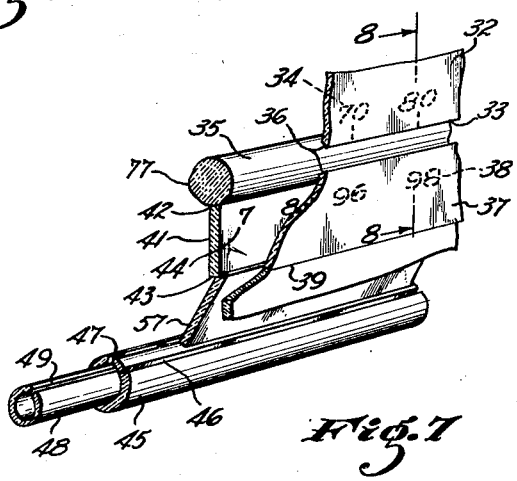
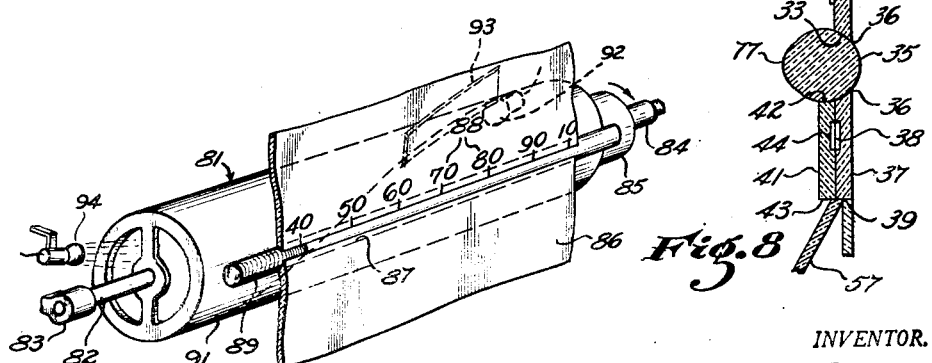
INVENTOR.
ROBERT E. PROCTOR JR.
BY
ATTORNEY Patented May 18, 1954

2,678,621

UNITED STATES PATENT OFFICE 2,678,621

INDICATING INSTRUMENT

Robert E. Proctor, Jr., Los Angeles, Calif.

Application March 8, 1948, Serial No. 13,651

12 Claims. (Cl. 116—56)

This invention relates to indicating apparatus, and more particularly relates to apparatus for use in connection with a device susceptible of movement, for indicating a function of such movement such as the speed thereof or the momentary position of the device.

The invention is applicable to a wide range of uses, as it may be connected mechanically to any element, preferably rotatable, which assumes a variety of positions in conformity with changes of position or speed, as it may be desired to indicate, of the related movable device. Such an element may, for example, be a magnetic drag mechanism of the kind commonly used as a connection to a speedometer or a tachometer; or a fly-ball and cam; or an hydraulic coupling, or a Bourdon tube; or a simple manually operated shaft such as the shaft of a radio tuning condenser. In the following description of the invention, I have chosen to describe the application of the invention to a speedometer and to a radio tuning mechanism, as prominent and easily understood illustrations of possible uses of the invention, but I do not limit the application of the invention to such uses, as it will be obvious that, by suitably altering the graduations, it may be adapted to a wide variety of arts.

An object of my invention is to provide an indicating apparatus in which a momentary position in a rotative movement is indicated upon a straight line scale.

Another object is to provide an indicating apparatus in which curvilinear indices, or indices at angles other than right angles to a straight line scale, will appear as at right angles to said scale so as to be more readily and accurately readable.

A further object is the provision of apparatus for indicating the momentary status of a moving or movable body in which the function of speed is associated with the dimension of length in the manner in which the measurement of temperature is associated with the height of the mercury column in a thermometer.

A more detailed object of the invention is to provide indicating apparatus having a simple movable index member and a plurality of graduated scales, each indicative of a different status or function of the connected device when read in relation to the index member, and means operable by the switching of the connected device from one function to another for making legible the then appropriate scale and for making illegible the inappropriate scales, so that whatever the momentary function of the device may be, the momentary status of that function alone is indicated.

Yet another object of the invention is to provide indicating apparatus adapted to utilize color as a means of increasing legibility.

A further object is to provide indicating apparatus adapted for use with devices of wide ranges or various functions, in which particular portions of the range or particular functions are denoted by changes of color in the indices.

The invention possesses other objects and features of advantage, some of which, with the foregoing, will be set forth in the following description of the preferred forms of my invention which are illustrated in the drawings accompanying and forming part of the specification. It is to be understood that I do not limit myself to the showing made by the said drawings and description, as I may adopt variations of the preferred forms within the scope of my invention as set forth in the claims.

Referring to the drawings:

Figure 5 is a frontal elevational view of a modified embodiment of my invention incorporated in a radio tuning device, having the added functions of tuning to frequency modulation and short wave, as well as to standard broadcast wave lengths.

Figure 6 is a transverse sectional view of the embodiment illustrated in Figure 5, the plane of section being indicated by the line 6—6 of Figure 5, with the direction of view as indicated.

Figure 7 is an enlarged fragmentary view in perspective, illustrating means for selectively illuminating some of the graduated scales.

Figure 8 is a further enlarged transverse sectional view of the scale illuminating means, also showing a modified form of lens, the plane of section being indicated by the line 8—8 of Figure 7, with the direction of view as indicated.

Figure 9 is a perspective elevational view of a further modified embodiment of my invention as applied to a speedometer.

Figure 1:
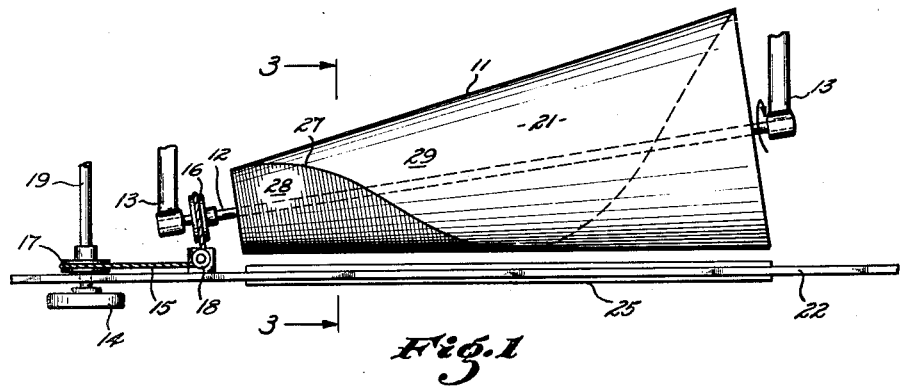
Figure 1 is a top plan view of an embodiment of my invention as incorporated in a radio tuning device, an important feature of this particular embodiment being the means employed to cause a curvilinear index to register as a straight line upon a kilocycle scale of evenly spaced numerical graduations.
Figure 2:
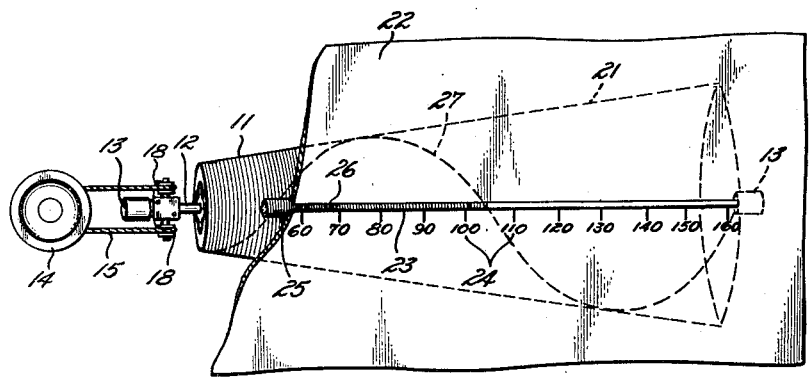
Figure 2 is a frontal elevation of the radio tuning indicating apparatus shown in Figure 1.

Specifically describing the embodiment of my invention illustrated in Figures 1 to 4, my improved indicating apparatus comprises a rotatable member 11 secured to a shaft 12 mounted in bearings 13 which, in the application of the invention to a radio tuning device, may be suitably secured to the radio chassis (not shown). The rotatable member 11 may be driven from a tuning knob 14 by means of a cord drive 15 operating on pulleys 16 and 17 and idler pulleys 18. The arrangement of the pulleys is preferably such that clockwise rotation of the tuning knob 14 causes clockwise rotation of the rotatable member 11 when viewed from the right, as indicated by the arrow in Figure 1. Such rotation of the rotatable member 11 will cause the upper portion of that member to rotate away from an observer viewing the apparatus frontally, as in Figure 2. It will be understood that a tuning condenser will be operably connected to the tuning knob 14, as by a shaft 19, so as to rotate in a fixed relation to the rotatable member 11.

The member 11 is preferably cone-shaped and is so mounted in the bearings 13 that its conical surface 21 rotates in close proximity to, and substantially parallel to, a screening member 22 which may suitably be a portion of the radio cabinet or an element secured to the radio chassis and visible through an orifice in the cabinet. The screening member 22 is provided with a slot 23 lying in the plane of the axis of the rotatable member 11, so as to afford a view of the adjacent conical surface 21. A graduated scale 24 is provided along a margin of the slot 23, and may be graduated in kilocycles for standard broadcasting, or by the identifying letters of broadcasting stations, or with other suitable figures. Within the slot 23 is mounted an elongated convex lens 25 which may suitably be formed from a length of glass rod of proper optical quality. The lens 25 is preferably of greater diameter than the slot 23 and is so held in the slot as to be longitudinally off-center and inwardly thereof, so that a considerable portion of the lens projects inwardly toward the rotatable member 11 to close proximity with the conical surface 21, and so that the longitudinal margins 26 of the slot screen the adjacent margins of the lens from view from the exterior of the apparatus.

An index line 27 is inscribed upon the conical surface 21. As is well known to those skilled in the art of radio, radios which are tuned by condensers usually have a wave length or kilocycle scale on which graduations of like difference of magnitude are set more closely together as they approach the high frequency end of the scale, although it is possible by the use of specially shaped condenser plates, which because of certain disadvantages are seldom used, to achieve "straight frequency tuning" in which graduations of like difference of magnitude are evenly spaced. In any condenser-tuned radio, therefore, the spacing of the graduations may be plotted as a curve based on an equation related to the shape of the particular condenser plates in use. Also, on a conical or cylindrical surface, a line may be inscribed so related to the aforesaid curve that when the cone or cylinder is disposed in relation to the scale as the member 11 is disposed in relation to the scale 24 in Figures 1 and 2, the line will progress lengthwise of the cone or cylinder from one graduation to another—successive graduations being of equal difference in magnitude—with the rotation of the cone or cylinder. "Straight frequency tuning" will require that such a line progresses more rapidly lengthwise with each successive unit of rotation, when the direction of rotation is such as to move the line towards the higher frequency end of the scale.

A helical line may be inscribed on a cone which will satisfy this condition, consideration being given, of course, to the shape of the cone. Such a helical line may more easily and advantageously be inscribed than a line of variable slope, and as it also has the advantage of "straight frequency tuning," the line 27 on the cone-shaped rotating member 11 is preferably a helix, and the graduated scale 24 is correspondingly inscribed with the graduations of like difference of magnitude at even intervals. As ordinarily a condenser has a rotary range of 180°, the index line 27 may be a helix having a rotation of 180° on that part of the cone 11 co-extensive with the graduated scale 24, in which case the cone will be geared to the condenser in a ratio of 1:1. Alternatively, as illustrated, the helix may have a rotation of 360°, and the cone may be geared to the condenser in a ratio of 2:1, or any other rotation of the helix may be employed by utilizing a suitable gear ratio. It will be apparent that a helix of lesser rotation will have a greater slope and will intersect the graduated scale at a more acute angle.

Preferably the surface 28 of the rotating member 11 lying on one side of the index line 27 is colored contrastingly with that portion 29 of the surface on the other side of the line, as for example, a red surface 28 contrasting with a white surface 29. The more positive or brilliant color is preferably on that portion of the surface which becomes increasingly visible through the slot 23 as the condenser, and consequently the rotating member 11, is rotated to tune to wave lengths of higher frequency. Alternatively, the index line 27 may itself be colored brightly in contrast with a neutral background.

When the condenser is tuned to a wave length of any particular frequency, the index line 27 will appear to cross the slot 23 at the appropriate graduation on the scale 24. Rotation of the member 11 will cause the line to move back and forth along the scale as an indication of the wave length to which the condenser is tuned. The line 27 will appear only as the boundary between the surfaces 28 and 29, and due to the contrasting colors of these surfaces it will appear like a ribbon in the slot 23. In the absence of the lens 25, the end of the ribbon—that is to say, the index line 27—would appear to cross the slot 23 obliquely and would not give a precise indication of the wave length, but the convex lens 25 has the property of distorting the image of an oblique line seen through it to appear as a line at a right angle to the longitudinal axis of the lens and therefore at a right angle to the slot 23 and to the scale 24.

Figures 3, 4:
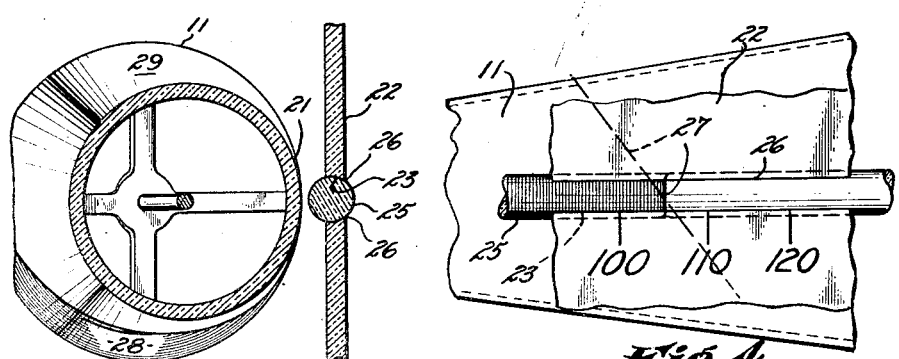
Figure 3 is a transverse sectional view on an enlarged scale, the plane of section being indicated by the lines 3—3 of Figure 1, with the direction of view as indicated.
Figure 4 is a fragmentary elevational view on an enlarged scale of a portion of the lens and screen shown in Figure 2, illustrating the optical action of the lens and the preferred relationship of the screen to the lens.

This property is enhanced and the image of the index line is clarified by the close proximity of the inner portion of the lens 25 to the rotating member 11. The margins of the lens will not refract the light rays as completely as the center portion does, and the line 27 would appear slightly curved at the limits of its visible portion if viewed through the whole lens, as is illustrated in Figure 4. However, the margins 26 of the screening member 22 cut off the incompletely refracted rays and the visible portion of the line 27 appears as a straight line terminating a brightly colored ribbon, and the apparatus may be easily and accurately read, like a thermometer.

In Figures 5 to 8, I have shown another application of my indicating apparatus to a radio tuning mechanism, which in this instance is more complex and involves tuning for frequency modulation (F. M.) and short wave (S. W.) as well as standard broadcast wave-lengths. A rotatable member 31 is connected in the same manner as heretofore described to a radio condenser, but is cylindrical rather than conical. Straight line graduation of a plurality of bands of differing curve equations can not be obtained with a single rotating member and a single index line, and no advantage would be gained by having the rotatable member 31 of conical form.

A screening member 32, which again may be secured either to the radio cabinet or to the radio chassis, is provided with a slot 33 parallel to and at the level of the axis of the rotatable member 31. The screening member 32 is preferably made of one of the acrylic resins, such as methyl methacrylate, commonly known as "plexiglas" or "lucite," which have the property of conducting or piping light in a manner similar to that in which a pipe conducts water. In addition, it is a property of the acrylic resins that an etching, or other interruption of the surface, glows brightly under the activation of transmitted light. A graduated scale 34 is painted in luminescent pigment on the rearward, or inward, side of the screening member 32, adjacent to the upper margin of the slot 33. The scale 34 is calibrated for the wave length of the standard broadcast band and may, in this modification of the invention, conform in spacing to the type of condenser plates in use, with variable spacing of kilocycle units of like difference of magnitude. An elongated convex lens 35 is mounted in the slot 33, being held inwardly thereof as heretofore described so that its upper and lower margins are concealed by the longitudinal margins 36 of the slot. The lower portion 37 of the screening member 32 has a graduated scale 38 etched in color on its inner side adjacent to the slot 33, which may for example be calibrated for F. M. tuning. Below the scale 38 the portion 37 terminates in an edge 39.

The portion 37 of the screening member 32 is backed by a strip 41 of acrylic resin which has its upper edge 42 in contact with the lens 35 and its lower edge 43 evenly disposed with and contiguous to the edge 39. A graduated scale 44 calibrated, for example, for short wave tuning, is etched in a color preferably contrasting with the color of the scale 38 adjacent to the upper edge 42 and on the forward side of the strip 41 adjacent to the lower portion 37 of the screening member 32. The margins 36 of the slot 33 and the upper edge 42 of the strip 41 are painted with an opaque paint, for reasons later to be set forth.

Below and parallel to the screening member 32 and the strip 41 is a tube 45 of opaque material, secured suitably to the radio cabinet or chassis and having a forward longitudinal slot 46 and a rearward longitudinal slot 47 in its upper segment. Within the tube 45 and rotatable therein is a second tube 48, having a longitudinal slot 49 in its upper segment. Extending into one end of the tube 48 is a tubular electric light bulb 50, supported as at 51 upon the radio chassis and electrically connected to the F. M. and S. W. radio circuits so as to be lighted when either of those circuits is in use. A pulley 52 on the inner tube 48 is connected by a cable drive 53 to a pulley 54 on the shaft 55 of a circuit selector switch. The switch 56, it will be understood, controls the selection of standard broadcast, F. M., and S. W. circuits. The pulleys 52 and 54, and the cable drive 53 are so arranged that when the switch 56 is turned to activate the F. M. circuit, the inner tube 48 is turned thereby to bring the slot 49 into register with the forward slot 46 of the tube 45, and when the switch 56 is turned to activate the S. W. circuit, the inner tube 48 is turned thereby to bring the slot 49 into register with the rearward slot 47. When the switch 56 is turned to activate the standard broadcast circuit, the slot 49 is brought to a position in which it is covered by the tube 45. An opaque shield 57 is mounted on the tube 45 between the slots 46 and 47 and extends upwardly to the lower edges 39 and 43 of the screening member 32 and the strip 41, making contact therewith at the junction of those edges so as to leave a substantial portion of each edge on opposite sides of the shield.

The rotatable member 31 has a helical index line 61 inscribed on its outer surface. As a helix on a cylinder progresses even longitudinal distances on the cylinder in response to even angular rotation of the cylinder, the index line 61 will appear to progress along the slot 33 in proportion to the rotation of the condenser plates, and will register appropriately with the standard broadcast graduated scale 34. The portion 62 of the cylinder surface which appears to follow the index line 61 as that line moves toward the higher frequency end of the scale 34 is painted with a pigment luminescent in ultra-violet or "black" light, and the remaining portion 63 of the cylinder surface is painted with a non-luminescent pigment matching the daylight or non-luminescent color of the portion 62. A number of luminescent pigments are available commercially which change color when activated by ultra-violet light and which then provide a desired brilliance in contrast to their color in daylight. Examples of such color changes are: daylight color, cerise—luminescent color, orange red; daylight color, light gray—luminescent color, orange yellow; daylight color, deep yellow—luminescent color, red. If the last of these examples was selected for painting the portion 62, the portion 63 would be painted with a non-luminescent deep yellow paint. In daylight, both portions would appear as deep yellow, but under ultra-violet light the portion 62 would glow red in contrast to the continuing deep yellow of portion 63. One or the other of the two pigments should also be translucent, and as that property may be more readily found in non-luminescent pigments, the pigment for painting the portion 63 should be selected with that end in view.

To activate the luminescent pigment of the cylinder surface portion 62 and of the standard broadcast graduated scale 34, a light bulb 64 of the type emitting ultra-violet light is secured to the radio chassis, as at 65, and is electrically connected in series with the standard broadcast circuit so as to be activated when that circuit is in use. The bulb 64 may be provided with a reflector 66 to reflect the light rays downwardly upon the cylinder 31 and on the graduated scale 34, which it will be recalled is on the inner side of the screening member 32.

The cylinder 31 is of translucent material which may suitably be an acrylic resin, and is hollow, being provided with a central shaft 67, rotatable in bearing 68, and secured centrally in the cylinder by end spiders 69. The inner surface 71 of the cylinder 31 is painted with an opaque paint, and is etched with a helical index line or ribbon 72, which approximately follows the course of the index line 61. The index ribbon 72 is, however, of material width, so as to transmit a ribbon of light through the cylinder wall, and is slightly offset from the index line 61 so as to bring it opposite the translucent pigment exteriorly covering the cylinder surface portion 63. The graduated scales 38 and 44 are disposed with such an offset in mind, so as to be accurate when read in conjunction with the index ribbon 72.

To illuminate the index ribbon 72, a light bulb 74 is secured to the radio chassis, as at 75, and provided with a reflector 76 to direct the light into the interior of the cylinder 31.

In order to obtain the most accurate view of the index line 61 and particularly of the index ribbon 72 which has a depth equal to the thickness of the cylinder wall, the lens 35 is provided with a longitudinal convexity 77 which extends into close proximity with the cylinder 31. The sharper curvature of the convexity 77 in the immediate vicinity of the cylinder surface reduces distortion of the image of the index and also reduces parallax, while the main cylindrical portion of the lens magnifies the accurate image formed by the convexity.

In respect to indicating the tuning of the standard broadcast band, the operation of this modification of my invention is similar to the operation of the embodiment first described, with the addition of special pigmentation and lighting. When the circuit selector is turned to standard broadcasting, the ultra-violet light bulb 64 is activated and the bulbs 50 and 74 are out of circuit. The luminescent surface 62 appears in the lens 35 as a bright thermometer-like ribbon, with its visible termination distorted by the lens from an oblique line to a line squarely normal to the graduated scale 34 which is also luminescent and now visible.

When the circuit selector is turned to either F. M. or S. W., the bulb 64 is extinguished and the bulbs 50 and 74 are lighted. The luminescent scale 34 becomes invisible, and the surface of the cylinder 31 now appears in the lens 35 as having a single color, except for a bright band at the location of the index ribbon 72, the light for which emanates from the bulb 74. This band is also distorted by the lens 35 to appear normal to the scales 38 and 44. If the circuit selector is turned to F. M., the slot 49 will emit light from the bulb 50 through the slot 46, and this light will be directed by the shield 57 to the edge 39 of the screening member 32 and away from the edge 43 of the strip 41. The light entering the edge 37 of the acrylic screening member 32 will be conducted upwardly through the portion 37 but will be prevented from escaping into the slot 33 by the opaque paint on the lower margin 36 of the slot. Thus the light is concentrated upon the etched scale 38 which is thereby illuminated, and at the same time the lens 35 is protected against a confusion of light rays. The scale 44 will remain invisible.

When the circuit selector is turned to S. W., the slot 49 will direct light from the bulb 50 through the slot 47, whence the light will be directed by the shield 57 to the edge 43 of the strip 41. The opaque paint on the upper edge 42 of the strip prevents the light from entering the lens 35 and concentrates it upon the etched scale 44. The scale 38 becomes invisible from lack of light.

Thus two forms of indices are provided, one a thermometer-like luminescent ribbon for standard broadcasting, and the other a bright vertical line for F. M. and S. W. Also, the three scales have individuality, one being luminescent and the other two being etched in different colors, and only one being visible at any time. The operator can tell at a glance to which broadcast band the radio is adjusted.

In Figure 9, I have illustrated the application of my invention to a speedometer. A cylinder 81 is mounted on a shaft 82 so as to be rotatable in bearings 83, and is operably connected to a speedometer cable in any conventional manner, such as a four-pole magnetic coupling mechanism 84 rotatable in a drag cup 85 attached rigidly to the shaft 82. A screening member 86, forming part of the front panel of the speedometer, has a slot 87 parallel to the axis of the cylinder in proximity to the cylinder surface and has a graduated miles-per-hour scale 88 adjacent to one margin of the slot. A lens 89, which may have the form of either the lens 25, as shown, or the lens 35, is mounted in the slot 87 so as to be marginally concealed by the margins of the slot.

An index line 91 is inscribed on the surface of the cylinder 81. If the coupling mechanism 84 is adapted to rotate the cylinder 81 through equal angles for equal increments of speed, the scale 88 may be evenly spaced and the index line 91 may be a true helix. If the cylinder 81 rotates unevenly in response to even changes of speed, either the graduations on the scale 88 should be unevenly spaced or the index line 91 should be a spiral of variable slope. The line 91 may be brightly painted, to provide a bright vertical ribbon image in the lens 89, or the cylinder surface areas on opposite sides of the index line may be painted in contrasting colors, to provide a horizontal thermometer-style ribbon. The operation of the lens 89 is as heretofore described in converting the visible portion of the index line 91 from a line oblique to the scale 88 to a line normal thereto.

A variety of color effects, indicative of transition from a moderate speed to a higher speed, may be provided with the described thermometer-style of indication, this best being accomplished by making that portion of the cylinder 81 to the left of and above the spiral 91, as viewed in Figure 9, translucent and colored, say, orange-yellow, while that portion of the cylinder 81 on the opposite side of the spiral line 91 is opaque, and by providing a secondary or auxiliary light bulb 92 which should be red if the translucent portion of the cylinder 81 is orange-yellow. As in the modification illustrated in Figures 5, 6, and 7, the interior of the cylinder 81 is continuously illuminated (while the apparatus is in operation) by light from a principal light source, as a bulb 94, which light should be white if the translucent portion of the cylinder is orange-yellow. The bulb 92 and a shield 93 therefor should be mounted in such position with respect to each other and with respect to the cylinder 81 that, as the cylinder 81 rotates past that position in which its spiral line 91 gives an indication of a predetermined speed, say, for example, fifty miles per hour, the translucent portion of the cylinder 81 will pass out from under the shadow cast by the shield 93, permitting red light from the bulb 92 to enter the cylinder 81, thus adding red to the white light from the bulb 94 with which the interior of the cylinder 81 constantly is illuminated. Consequently, as the predetermined speed of, say, fifty miles per hour, is reached, the color of the thermometer-type indication visible through the slot 87 in the screening member 86 will rather abruptly become red and thus effectually serve as a warning. In other words, so long as the vehicle upon which the instrument is mounted is travelling at any speed below the said predetermined speed, light emanating from the auxiliary bulb 92 reaches only opaque portions of the cylinder 81, and, consequently, such light is ineffective insofar as its influence on the color of the instrument's visual indication is concerned.

It is a feature of the lenses 25, 35, and 89 that each provides an image giving an impression of depth which, while attractive to the eye, is usually associated with excessive parallax and inaccurate scale readings. Because of the short distance between the lenses and the indices, there is actually very little parallax, and the observer sees the image as it emerges from the lens in approximately the plane of the graduated scales and so is enabled to gauge accurately the setting of the apparatus.

I claim:

1. Indicating apparatus for a device susceptible of movement, comprising a screening member having graduations thereon along an edge thereof, an elongated member having a curved surface and rotatable about its major axis behind said screening member to move successive portions of said curved surface into view in proximity to said edge as said elongated member is rotated, a helically bounded portion of said surface being translucent and colored distinctively from the remainder of said surface, a source of illumination for said translucent portion behind said curved surface, an auxiliary light source colored distinctively from said first-mentioned source of light and disposed in front of said curved surface, said auxiliary light source being so disposed with respect to said curved surface that light therefrom passes through said translucent portion when a predetermined area of said curved surface is in view adjacent said edge of said screening member and light from said auxiliary light source is excluded from behind said curved surface when another area of said curved surface is in view adjacent said edge of said screening member, and a rod shaped lens of substantially circular cross-sectional configuration arranged parallel to and behind said edge for viewing the proximal portion of said surface, said lens being convex in the direction of view past said edge toward said surface.

2. Indicating apparatus for a device susceptible of movement, comprising a screening member having a slot and having indicating figures evenly spaced in relation to their magnitude forming a graduated rectilinear scale adjacent to said slot, an elongated member having a curved surface and rotatable about its major axis and so disposed to said slot that successive generatrices of said elongated member appear visible in said slot when said elongated member is rotated, a helically bounded portion of said surface being translucent and colored distinctively from the remainder of said surface, a primary source of illumination for said translucent portion behind said curved surface, a secondary light source colored distinctively from said primary light source and disposed in front of said curved surface, a light shield disposed in front of said curved surface and so positioned with respect to the secondary light source and said curved surface that light from said secondary light source passes through said translucent portion when a predetermined area of said translucent portion is in conjunction with said light screen and light from said secondary light source is excluded from said translucent portion for all other areas of said curved surface, and a rod shaped lens arranged parallel to and behind said screening member for viewing the proximal portion of said surface, said lens being of substantially circular cross-sectional configuration.

3. Indicating apparatus comprising a scale, a member having a curved surface mounted adjacent said scale and for rotary movement with respect thereto about the center of curvature of said surface, a helically bounded portion of said surface being translucent and colored distinctively from the remainder of said surface, a primary source of illumination for said translucent portion behind said curved surface, a secondary light source colored distinctively from said primary light source and disposed in front of said curved surface, and a light shield disposed in front of said curved surface and so disposed with respect to said secondary light source and said curved surface that light from said secondary light source passes through said translucent portion and thereby alters the color of the light behind said curved surface only after said curved surface has moved to and beyond a predetermined position with respect to said scale.

4. Indicating apparatus comprising a scale, a member having a curved surface mounted adjacent said scale and for rotary movement with respect thereto about the center of curvature of said surface, a helically bounded portion of said surface being translucent and colored distinctively from the remainder of said surface, a primary source of illumination for said translucent portion behind said curved surface, a secondary light source colored distinctively from said primary light source and disposed in front of said curved surface, a light shield disposed in front of said curved surface and so disposed with respect to said secondary light source and said curved surface that light from said secondary light source passes through said translucent portion and thereby alters the color of the light behind said curved surface only after said curved surface has moved to and beyond a predetermined position with respect to said scale, and an elongated cylinder of transparent material mounted adjacent and parallel to said scale whereby the image of the helical boundary of said translucent portion, when viewed from the opposite side of said scale from said rotatably mounted member appears as a substantially straight line perpendicular to said scale.

5. In a speedometer, the combination of a right circular cylinder revoluble about its geometric axis in response to changes in speed of a vehicle, said cylinder being delineated with a spiral line making substantially one full revolution of said cylinder and thereby separating two contiguous zones of said cylinder's surface, said zones being colored distinctively from each other and one being opaque and the other translucent, a long lens co-extensive with said cylinder and having a substantially circular cross-sectional configuration constant throughout the length of said lens, said lens being so disposed in relation to said spiral line that the view thereof is a straight line which is at right angles to the longitudinal axis of said lens, a calibrated linear scale co-extensive with said cylinder and in registration with said lens as a means for measuring the length of the thermometer-like indication produced, a primary colored light source illuminating said thermometer-like indication, a secondary light source colored distinctively from the primary light source, and an opaque screen so positioned in relation to said cylinder that it and said line of separation of said opaque and translucent zones are a means of control for admitting light to or screening light from the interior of the cylinder and thereby changing the color of the thermometer-like indication in response to the movement of the cylinder.

6. In a speedometer, a screen having therein a rectilinear slot and provided with markings forming a graduated scale along a margin of said slot; a cylindrical index member mounted behind said screen for rotation in response to changes in speed of a vehicle, said index member having separate zones adjoining to define a helical index line, said zones being of contrasting color and being opaque and translucent respectively; a convex rod-form lens, coextensive with said cylinder, mounted in said slot, the cross sectional shape of said lens and its spacing from said cylinder and the angle of crossing of said slot by said index line being such that the image of said index line in said lens will be perpendicular to the edges of said slot; a pair of light sources of contrasting colors; and a helical screen disposed between said light sources along a path adapted to register with said index line in an intermediate position of rotation of said cylinder, whereby in any position of the cylinder preceding said intermediate position, the rays of only one of said light sources will penetrate said translucent zone of the cylinder whereas in any position of the cylinder beyond said intermediate position, the rays of the other light source will penetrate said translucent zone so as to produce an abrupt change in the color of illumination of said cylinder.

7. In a speedomter, the combination of a right circular cylinder revoluble about its geometric axis and responsive to changes in speed of a vehicle, said cylinder being delineated with a helical line making substantially one complete revolution of said cylinder and defining contiguous zones of said cylinder distinctively colored one from the other, a long lens co-extensive with said cylinder with a cross-section that is substantially circular and which is constant about the longitudinal axis of said lens, said helical line being of constant pitch so as to cross the axis of said lens with a constant angle at all points of crossing developed by the rotation of said member; said lens being so disposed in relation to said helical line that the refraction pattern thereof is a straight line which is at right angles to the longitudinal axis of the lens, a calibrated linear scale co-extensive with the cylinder and in registration with the lens as a means for measuring the length of the thermometer-like indication produced, and means for producing a substantially instantaneous change in the color of the thermometer-like indication at selective vehicle speeds as a visible warning of the transition from a lower to a higher speed.

8. Indicating apparatus comprising: means defining a rectilinear margin, said means having a graduated scale along said margin; an elongated rotatable member of circular cross section having a curved surface provided with a helical line crossing said margin at a constant angle at all points of crossing developed by the rotation of said member; said rotatable member being of conical form and said helical line being of spiral form; and a convex, rod-form lens disposed along said margin in the line of sight along which said index line is viewed, said constant angle being so related to said lens as to cause the image of that portion of said index line which is viewed through said lens, to be disposed perpendicular to said margin; the rotation of said rotatable member being utilized for radio tuning and determinative of a wave frequency the changes of which are non-proportional to the angular changes of position of said rotatable member by which said wave frequency changes are produced, said scale having calibration marks of equal spacing to denote equal increments of change in said wave frequency and the angle of said cone being so related to said helical line as to effect both said constant angle of crossing and uniform registration of said image, with said calibration marks, for equal increments of change.

9. Indicating apparatus comprising: a screen having therein a rectilinear slot and provided with a graduated scale along a margin of said slot; an elongated index member of circular cross-section rotatably mounted immediately behind said screen on an axis parallel to said slot and directly behind the same, whereby a central longitudinal strip of said index member is visible through said slot, said index member having thereon a helical index line extending substantially from end to end thereof, and said index member having surfaces of contrasting color on respective sides of said helical line, the respective surfaces commencing at said helical line throughout the longitudinal extent thereof and extending axially therefrom in opposite directions to the respective ends of the cylinder throughout the circumferential extent of revolution of said index member, said helical index line crossing said slot at a constant angle at all points of crossing developed by rotation of said member; and a convex, rod-form lens disposed in said slot, with the side margins thereof concealed by said screen; said lens being so spaced from said index member and said constant angle being so related to said lens as to cause the image of that portion of said index line which is viewed through said lens and visible through said slot, to be disposed perpendicular to said margin, whereby one of said colored surfaces will appear, through said slot, in the form of a colored ribbon having a squared end advancing or retreating in accordance with the rotation of said index member in opposite directions, said squared end providing for accurate reading of said image with relation to said scale.

10. Indicating apparatus with thermometer style of visual indication, comprising: a screen having therein a rectilinear slot and provided with a graduated scale along a margin of said slot; an elongated cylindrical index member rotatably mounted immediately behind said screen on an axis parallel to said slot and directly behind the same, whereby a central longitudinal strip of said index member is visible through said slot, said index member having thereon a helical index line extending substantially from end to end thereof, and crossing said slot at a constant angle at all points of crossing developed by rotation of said member; said helical index line having surfaces of contrasting color on respective sides of said helical line, the respective contrasting surfaces commencing at said helical line throughout the longitudinal extent thereof and extending axially therefrom in opposite directions to the respective ends of said index member throughout the circumferential extent of revolution of said index member; and a convex, rod-form, substantially cylindrical lens disposed in said slot, said lens being so spaced from said index member and said constant angle being so related to said lens as to cause the image of that portion of said index line which is viewed through said lens and visible through said slot, to be disposed perpendicular to said margin, whereby one of said colored surfaces will appear, through said slot, in the form of a colored ribbon having a squared end advancing or retreating in accordance with the rotation of said index member in opposite directions, said squared end providing for accurate reading of said image with relation to said scale.

11. Indicating apparatus with thermometer style of visual indication, comprising: means defining a rectilinear margin, said means having a graduated scale with evenly spaced calibrations along said margin; an elongated cylindrical index member rotatably mounted immediately behind said screen on an axis parallel to the said slot and directly behind the same, whereby a central longitudinal strip of said index member is visible through said slot, said index member having thereon a helical index line extending substantially from end to end thereof and crossing said slot at a constant angle at all points of crossing developed by rotation of said index member; and said index member having thereon surfaces of contrasting color on respective sides of said helical line, the respective surfaces commencing at said helical line throughout the longitudinal extent thereof and extending axially therefrom in opposite directions to the respective ends of the said index member throughout the circumferential extent of revolution of said index member; the total angular displacement of said index line around the circumference of said index member being in excess of 270°; and a convex, rod-form, substantially cylindrical lens disposed in said slot, said lens being so spaced from said index member and said constant angle being so related to said lens as to cause the image of that portion of said index line which is viewed through said lens and visible through said slot, to be disposed perpendicular to said margin, whereby one of said colored surfaces will appear, through said slot, in the form of a colored ribbon having a squared end advancing or retreating in accordance with the rotation of said index member in opposite directions, said squared end providing for accurate reading of said image with relation to said scale, said equally spaced calibration marks functioning to denote equal magnitudes of change in a value determined by the rotation of said cylinder which produces corresponding registration of said squared end of the image with said calibration marks.

12. Radio tuning indicator apparatus comprising: means defining a rectilinear margin, said means having along said margin a graduated scale with calibration marks of equal spacing to denote equal increments of change in wave frequency to be indicated by said apparatus; said means providing a window for sight past said rectilinear margin; and an elongated rotatable member rotatable about an axis parallel to said rectilinear margin, said member having a conical surface provided with a helical spiral line of constant pitch and crossing said margin at a constant angle at all points of crossing developed by rotation of said member; the cone angle of said member being so related to said helical spiral line as to affect both said constant angle of crossing and uniform registration of that portion of said helical line which is visible adjacent said margin through said sight aperture, with said calibration marks, for equal increments of change of said wave frequency.

References Cited in the file of this patent

UNITED STATES PATENTS

| Number | Name | Date |
|---|---|---|
| 1,706,519 | Booth | Mar. 26, 1929 |
| 1,761,947 | Wedin | June 3, 1930 |
| 2,117,441 | McWeeny | May 17, 1938 |
| 2,151,579 | Bacon | Mar. 21, 1939 |
| 2,247,076 | Arey | June 24, 1941 |
| 2,272,574 | Nothe | Feb. 10, 1942 |
| 2,297,851 | Wyso | Oct. 6, 1942 |
| 2,309,941 | Drummond | Feb. 2, 1943 |
| 2,331,149 | Van Buren | Oct. 5, 1943 |
| 2,394,287 | Bludworth | Feb. 5, 1946 |

FOREIGN PATENTS

| Number | Country | Date |
|---|---|---|
| 771,301 | France | Oct. 5, 1934 |